United States Patent
Yang et al.

(10) Patent No.: US 10,443,852 B2
(45) Date of Patent: Oct. 15, 2019

(54) LOBE LANCE FOR A GAS TURBINE COMBUSTOR

(71) Applicant: Ansaldo Energia Switzerland AG, Baden (CH)

(72) Inventors: Yang Yang, Nussbaumen (CH); Michael Düsing, Rheinfelden (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 621 days.

(21) Appl. No.: 14/947,386

(22) Filed: Nov. 20, 2015

(65) Prior Publication Data

US 2016/0146466 A1    May 26, 2016

(30) Foreign Application Priority Data

Nov. 20, 2014 (EP) .................................... 14194098
Nov. 28, 2014 (EP) .................................... 14195483

(51) Int. Cl.
*F23R 3/28* (2006.01)
*F23C 7/00* (2006.01)
(Continued)

(52) U.S. Cl.
CPC .............. *F23R 3/283* (2013.01); *F02C 7/222* (2013.01); *F23C 7/002* (2013.01); *F23R 3/12* (2013.01);
(Continued)

(58) Field of Classification Search
CPC ...... F23R 3/12; F23R 3/18; F23R 3/20; F23R 3/286; F23R 3/16; F23R 2900/03341; F23C 7/002; Y02T 50/675
See application file for complete search history.

(56) References Cited

U.S. PATENT DOCUMENTS

| 4,932,861 A | 6/1990 | Keller et al. |
| 5,431,018 A | 7/1995 | Keller |

(Continued)

FOREIGN PATENT DOCUMENTS

| EP | 0 677 644 A1 | 10/1995 |
| EP | 1 257 809 B1 | 10/2007 |

(Continued)

OTHER PUBLICATIONS

Extended Search Report dated May 19, 2015, by the European Patent Office for Application No. 14194098.1.

(Continued)

*Primary Examiner* — William H Rodriguez
*Assistant Examiner* — Kyle Robert Thomas
(74) *Attorney, Agent, or Firm* — Buchanan Ingersoll & Rooney PC

(57) ABSTRACT

A lobe lance is disclosed for a gas turbine combustor which includes a plurality of N (N≥4) lobe fingers, each configured as a streamlined body with two lateral surfaces. A plurality of nozzles for injecting a gaseous and/or liquid fuel mixed with air are provided whereby lobes running between the nozzles are provided for improving the mixing quality and reducing pressure loss in said combustor. The lobes of each lobe finger have one of two opposite orientations with respect to said flow direction, and the lobes of all lobe fingers follow a predetermined pattern of orientation across the lobe fingers at least one pair of neighboring lobe fingers has the same lobe orientation resulting in a grouped lobe arrangement ( . . . LL . . . or . . . RR . . . ) such that at least two of the vortices generated by the lobe shape downstream of the lobe fingers combine.

12 Claims, 2 Drawing Sheets

(51) Int. Cl.
*F23R 3/12* (2006.01)
*F23R 3/18* (2006.01)
*F23R 3/20* (2006.01)
*F23R 3/16* (2006.01)
*F02C 7/22* (2006.01)

(52) U.S. Cl.
CPC ............... *F23R 3/16* (2013.01); *F23R 3/18* (2013.01); *F23R 3/20* (2013.01); *F23R 3/286* (2013.01); *F23R 2900/03044* (2013.01); *F23R 2900/03341* (2013.01); *Y02T 50/675* (2013.01)

(56) References Cited

U.S. PATENT DOCUMENTS

| | | | |
|---|---|---|---|
| 5,577,889 A | | 11/1996 | Terazaki et al. |
| 5,626,017 A | | 5/1997 | Sattelmayer |
| 8,402,768 B2 | * | 3/2013 | Syed ............... F23R 3/20 431/181 |
| 8,511,087 B2 | | 8/2013 | Fox et al. |
| 2002/0187448 A1 | | 12/2002 | Eroglu et al. |
| 2003/0128364 A1 | | 7/2003 | Dickopf et al. |
| 2011/0027102 A1 | | 2/2011 | Nakamata et al. |
| 2012/0260622 A1 | | 10/2012 | Poyyapakkam et al. |
| 2012/0272659 A1 | * | 11/2012 | Syed ............... F23R 3/12 60/791 |
| 2012/0285173 A1 | * | 11/2012 | Poyyapakkam ........ F23C 7/004 60/772 |
| 2012/0297787 A1 | * | 11/2012 | Poyyapakkam ...... B01F 5/0451 60/772 |
| 2012/0324863 A1 | | 12/2012 | Winkler et al. |
| 2013/0067920 A1 | | 3/2013 | Fox et al. |
| 2013/0086912 A1 | | 4/2013 | Berry et al. |
| 2014/0033728 A1 | | 2/2014 | Marmilic et al. |
| 2014/0109588 A1 | * | 4/2014 | Ciani ............... F23R 3/286 60/776 |
| 2014/0123665 A1 | * | 5/2014 | Wood ............... F23R 3/346 60/774 |
| 2014/0318135 A1 | * | 10/2014 | Knapp ............... F23R 3/14 60/737 |

FOREIGN PATENT DOCUMENTS

| | | |
|---|---|---|
| EP | 2 233 693 A1 | 9/2010 |
| EP | 2496884 A2 | 9/2012 |
| EP | 2 522 912 A1 | 11/2012 |
| EP | 2522912 A1 | 11/2012 |
| EP | 2 578 943 A2 | 4/2013 |
| EP | 2 725 301 A1 | 4/2014 |
| EP | 2 725 302 A1 | 4/2014 |
| EP | 2 725 303 A2 | 4/2014 |
| JP | 2013520635 A | 6/2013 |
| WO | WO 2011/054739 A2 | 5/2011 |
| WO | WO 2011/054760 A1 | 5/2011 |
| WO | WO 2011/054766 A2 | 5/2011 |
| WO | WO 2012/136787 A1 | 10/2012 |

OTHER PUBLICATIONS

Extended European Search Report dated Mar. 22, 2016, by the European Patent Office in corresponding European Patent Application No. 14195483.4-1602. (8 pages).

First Office Action dated Nov. 30, 2018, by the Chinese Patent Office in corresponding Chinese Patent Application No. 201510804715.7, and an English Translation of the Office Action. (17 pages).

* cited by examiner

LOBE LANCE FOR A GAS TURBINE COMBUSTOR

BACKGROUND OF THE INVENTION

The present invention relates to the technology of gas turbines and to a lobe lance for a gas turbine combustor.

PRIOR ART

In order to achieve a high efficiency, a high turbine inlet temperature is required in standard gas turbines. As a result, there arise high NOx emission levels and high life cycle costs. These problems can be mitigated with a sequential combustion cycle, wherein the compressor delivers nearly double the pressure ratio of a conventional one. The main flow passes the first combustion chamber (e.g. using a burner of the general type as disclosed in U.S. Pat. No. 4,932,861, also called EV combustor, where the EV stands for environmental), wherein a part of the fuel is combusted. After expanding at the high-pressure turbine stage, the remaining fuel is added and combusted (e.g. using a burner of the type as disclosed in U.S. Pat. Nos. 5,431,018 or 5,626,017 or in US 2002/0187448, also called SEV combustor, where the S stands for sequential). Both combustors contain premixing burners, as low NOx emissions require high mixing quality of the fuel and the oxidizer.

An exemplary gas turbine of the applicant with sequential combustion, which is known as GT26, is shown in FIG. 1.

Gas turbine 10 of FIG. 1 comprises a rotor 11 with a plurality of blades rotating about a machine axis 20 and being surrounded by a casing 12. Air is taken in at air inlet 13 and is compressed by compressor 14. The compressed air is used to burn a first fuel in a first (annular) combustor 15, thereby generating hot gas. The hot gas drives a first, high pressure (HP) turbine 16, is then reheated in a second (annular, sequential) combustor 17, drives a second, low pressure (LP) turbine 18 and exits gas turbine 10 through exhaust gas outlet 19.

Since the second combustor 17 is fed by expanded exhaust gas of the first combustor 15, the operating conditions allow self ignition (spontaneous ignition) of the fuel air mixture without additional energy being supplied to the mixture. To prevent ignition of the fuel air mixture in the mixing region, the residence time therein must not exceed the auto ignition delay time. This criterion ensures flame-free zones inside the burner. This criterion poses challenges in obtaining appropriate distribution of the fuel across the burner exit area. SEV-burners are currently designed for operation on natural gas and oil only. Therefore, the momentum flux of the fuel is adjusted relative to the momentum flux of the main flow so as to penetrate into the vortices. The subsequent mixing of the fuel and the oxidizer at the exit of the mixing zone is just sufficient to allow low NOx emissions (mixing quality) and avoid flashback (residence time), which may be caused by auto ignition of the fuel air mixture in the mixing zone. The cross flow injection concept used in the current SEV-fuel injection devices (SEV fuel lances) necessitates high-pressure carrier air supply, which reduces the overall efficiency of the power plant.

Various means for enhancing the fuel/air mixing in a secondary burner have been proposed in the prior art.

Document EP 2 522 912 A1 relates to a combined flow straightener and mixer as well as a burner for a combustion chamber of a gas turbine comprising such a mixing device. For a combined function of flow straightening and mixing at least two streamlined bodies are arranged in a structure comprising the side walls of the mixer. The leading edge area of each streamlined body has a profile, which is oriented parallel to a main flow direction prevailing at the leading edge position, and wherein, with reference to a central plane of the streamlined bodies the trailing edges are provided with at least two lobes in opposite transverse directions. The periodic deflections forming the lobes from two adjacent streamlined bodies are out of phase. The disclosure further relates to a burner for a combustion chamber of a gas turbine, comprising such a flow straightener and mixer as well as at least one nozzle having its outlet orifice at or in a trailing edge of the streamlined body. Further, it relates to the operation of such a burner.

Document EP 2 725 301 A1 relates to a burner for a combustion chamber of a gas turbine with a mixing and injection device, wherein the mixing and injection device is comprising a limiting wall that defines a gas-flow channel and at least two streamlined bodies, each extending in a first transverse direction into the gas-flow channel. Each streamlined body has two lateral surfaces that are arranged essentially parallel to the main-flow direction, the lateral surfaces being joined to one another at their upstream side to form a leading edge of the body and joined at their downstream side to form a trailing edge of the body. Each streamlined body has a cross-section perpendicular to the first transverse direction that is shaped as a streamlined profile. At least one of said streamlined bodies is provided with a mixing structure and with at least one fuel nozzle located at its trailing edge for introducing at least one fuel essentially parallel to the main-flow direction into the flow channel, wherein at least two of the streamlined bodies have different lengths along the first transverse direction such that they may be used for a can combustor.

Document EP 2 725 303 A2 discloses a reheat burner arrangement comprising a center body, an annular duct with a cross-section area, an intermediate fuel injection plane located along the center body and being actively connected to the cross section area of the annular duct, wherein the center body is located upstream of a combustion chamber, wherein the structure of the reheat burner arrangement is defined by various parameters and the structure of the reheat burner arrangement is defined by various dependencies.

While second combustor 17 of exemplary gas turbine 10 of FIG. 1 is of an annular design, other secondary combustors are of a rectangular design.

Document WO 2011/054766 A2 discloses (especially in FIG. 6) a burner of a rectangular design for a combustion chamber of a gas turbine, with an injection device for the introduction of at least one gaseous and/or liquid fuel into the burner, wherein the injection device has at least one body which is arranged in the burner with at least one nozzle for introducing the at least one fuel into the burner, the at least one body being configured as a streamlined body which has a streamlined cross-sectional profile and which extends with a longitudinal direction perpendicularly or at an inclination to a main flow direction prevailing in the burner, the at least one nozzle having its outlet orifice at or in a trailing edge of the streamlined body, and wherein, with reference to a central plane of the streamlined body the trailing edge is provided with at least two lobes in opposite transverse directions.

SUMMARY OF THE INVENTION

It is an object of the present invention to provide a burner (preferably rectangular) with a lobe lance with at least four parallel fingers with an optimized orientation of the lobes of the individual fingers.

This object is obtained by a lobe lance according to Claim 1.

The lobe lance according to the invention for a gas turbine combustor comprises a plurality of N (N≥4) lobe fingers, whereby each of said lobe fingers is configured as a streamlined body which has a streamlined cross-sectional profile, whereby said body has two lateral surfaces essentially parallel to a direction of hot gas flow, whereby said lateral surfaces are joined at their upstream side by a leading edge and joined at their downstream side forming a trailing edge, whereby a plurality of nozzles for injecting a gaseous and/or liquid fuel mixed with air is distributed along said trailing edge, and whereby lobes running between said nozzles are provided at said trailing edge for improving the mixing quality and reducing pressure loss in said combustor.

It is characterized in that the lobes of each lobe finger can have one of two opposite orientations with respect to said flow direction, and that the lobes of all lobe fingers follow a predetermined pattern of orientation across the lobe fingers, and that at least one pair of neighboring lobe fingers (22a-d) has the same lobe orientation resulting in a grouped lobe arrangement ( . . . LL . . . or . . . RR . . . ) such that at least two of the vortices generated by the lobe shape downstream of said lobe fingers combine.

According to an embodiment of the invention $N=N_R+N_L$ with $N_R$ being the number of lobe fingers having a first lobe orientation, and $N_L$ being the number of lobe fingers having a second lobe orientation opposite to said first lobe orientation. Preferably, $N_R$ and $N_L$ are both at least 1. Preferably, $N_R$ and $N_L$ are equal or approximately equal.

Specifically, at least one pair of neighboring lobe fingers has the same lobe orientation resulting in a grouped lobe arrangement, which allows some of the vortices generated by the lobe shape downstream of said lobe fingers to combine into a single vortex, and thereby enhance mixing. A combined single vortex can have a larger cross section in a plane normal to the main flow direction than each of the vortices leaving the lobe fingers thereby enhancing a mixing across a burner.

Specifically, said predetermined pattern of orientation is one of the following patterns:
1. RR . . . RRLL . . . LL,
2. LL . . . LLRR . . . RR,
3. RR . . . RRLL . . . LLRR( . . . RRLL . . . LL),
4. LL . . . LLRR . . . RR(LL . . . LLRR . . . RR),
5. RRLL . . . LLRR( . . . RRLL),
6. LLRR . . . RRLL( . . . RRLL),
with $N/2=N_R=N_L$ for N being an even number, or with $N/2=N_R+0.5=N_L-0.5$ or $N/2=N_R-0.5=N_L+0.5$ for N being an odd number.

More specifically, N=8, and said predetermined pattern of orientation is one of the following patterns:
1. RRRRLLLL,
2. LLLLRRRR,
3. RRLLRRLL,
4. LLRRLLRR,
5. RRLLLLRR,
6. LLRRRRLL.

According to another embodiment of the invention N=4.

Specifically, said predetermined pattern of orientation is either RRLL or LLRR.

Specifically, said predetermined pattern of orientation is either RLLR or LRRL.

Specifically, said predetermined pattern of orientation is one of the following patterns:
RRRL, RLLL,
LLLR, LRRR,
RRRR, LLLL.

According to a further embodiment of the invention said lobe fingers are arranged between left and right side walls, and the two lobe fingers adjacent to said side walls have a predetermined lobe orientation according to one of the following schemes:
(left wall) R . . . L (right wall),
(left wall) L . . . R (right wall).

Specifically, each of said lobe fingers has an even number of nozzles, and that the two lobe fingers adjacent to said side walls have a predetermined lobe orientation according the scheme (left wall) R . . . L (right wall).

Specifically, each lobe finger has a lobe finger chord bisecting the lobe finger from the leading edge to the trailing edge and the lobe finger chords of two of said lobe fingers are closer to each other at the trailing edge than at the leading edge.

Another embodiment comprises a gas turbine comprising a lobe lance as described above.

For example, a second burner of a gas turbine with sequential combustion, such as GT26, can comprise a lobe lance as described above. The lobe lance can also be provided in a second burner of a gas turbine with sequential combustion without a high pressure turbine between first and second combustors. Such a gas turbine architecture is for example shown in WO2012136787A1.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

According to the invention grouped or alternating neighboring lobe fingers are the cause to have local combined vortices (grouped) or not (alternating); thus it defines the level of large scale mixing of fuel, cooling air and hot gas. The arrangement is defined based on the burner size and possible numbers of lobe fingers. With current rectangular sequential burner, a four finger arrangement is proper. However, the arrangements will not be limited to four finger arrangements.

Within a reheat burner an arrangement of three lobe fingers behaves differently than an arrangement with four fingers or more. For such an arrangement grouped lobes allow the vortices to combine with each other (two or more vortices can combine into a single vortex) and thereby create large scale structures, which enhance mixing and are thus beneficial for NOx, CO and overall temperature distribution factor (OTDF).

Figure 1:
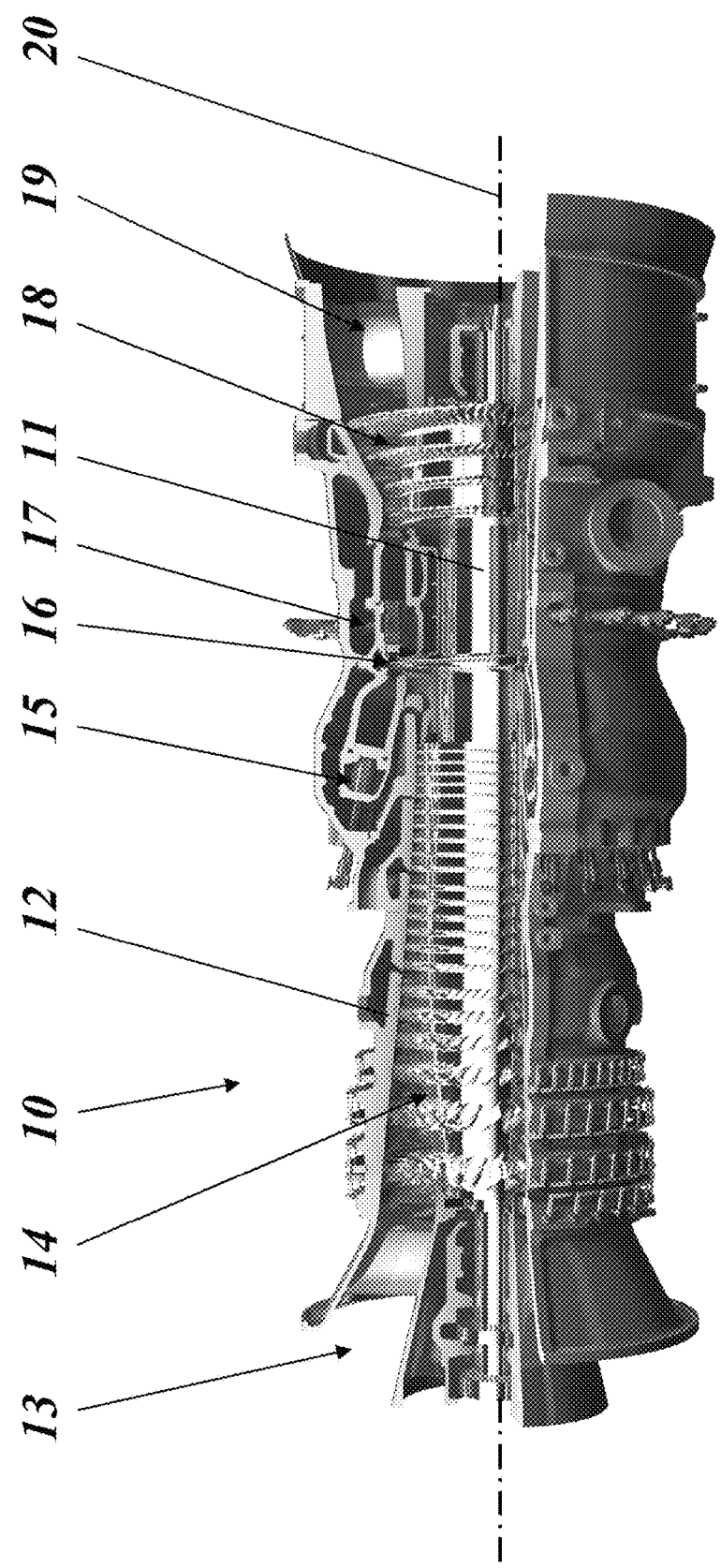
FIG. 1 is a perspective view of an exemplary gas turbine with sequential combustion of the type GT26.
Figure 2:
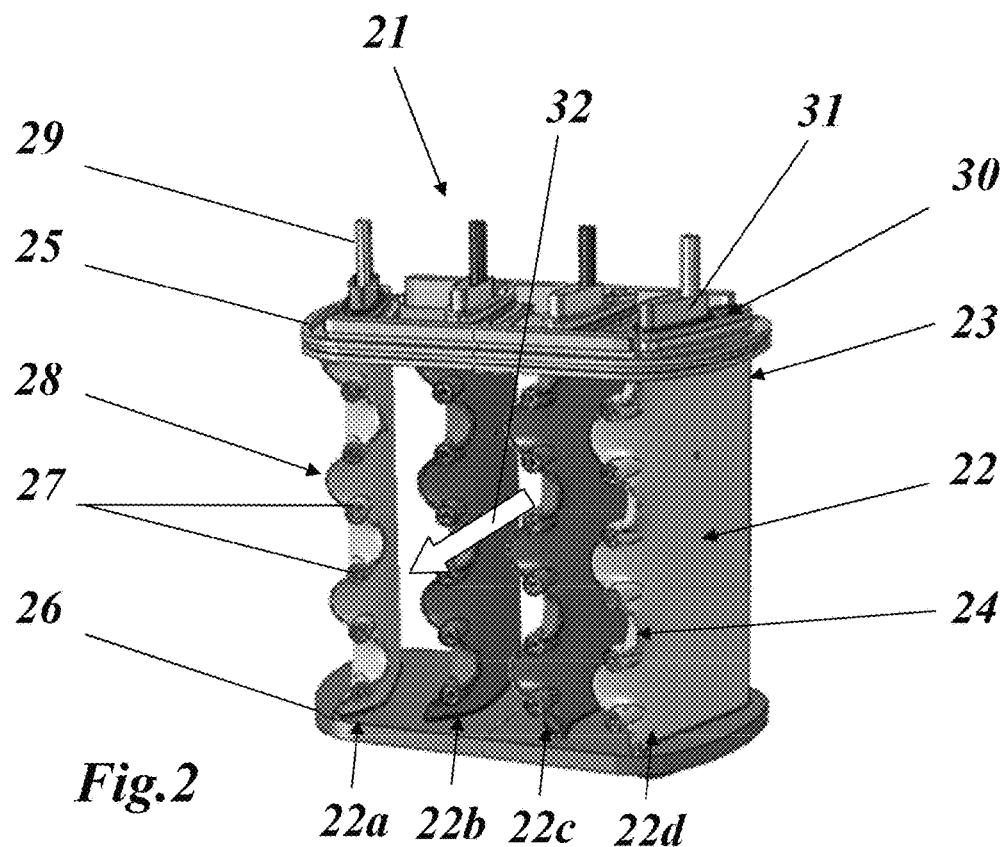
FIG. 2 shows a lobe lance for a secondary combustor of rectangular design according to an embodiment of the invention.

A lobe lance according to an example of the invention is shown in FIG. 2. Lobe lance 21 of FIG. 2, which is preferably to be used with a rectangular burner, comprises four separate fingers 22a-d extending in parallel between an upper plate 25 and a lower plate 26. Each finger 22 is configured as a streamlined body which has a streamlined cross-sectional profile (like an airfoil). The body has two lateral surfaces essentially parallel to an axial hot gas flow with flow direction 32, which passes through the lance between upper and lower plates 25, 26. The lateral surfaces are joined at their upstream side by a leading edge 23 and joined at their downstream side forming a trailing edge 24.

A plurality of nozzles 27 for injecting a gaseous and/or liquid fuel mixed with air is distributed along the trailing edge 24. Each of said fingers 22 has an air plenum 30 for air supply, a gas plenum 31 for gaseous fuel supply, and a liquid fuel supply 29. Means for improving the mixing quality and reducing pressure loss in said secondary combustor are provided in the trailing edge region of said body in form of lobes 28 running between the nozzles 27 at the trailing edge 24.

Lobes 28 of the various fingers 22 generate vortices in the downstream flow of the fuel/air mixture, whereby the vortex flow of the different fingers 22 interact with each other. This interaction, which is able to enhance the mixing effect, depends on the orientation of lobes 28 in each finger.

As can be seen at the lobe lance 21 shown in FIG. 2, the lobes 28 of the different fingers 22a-d can have two different orientations. In this case, the lobes 28 of the left two fingers 22a and 22b have the same orientation, which is opposite to the orientation of the lobes 28 of the right two fingers 22c and 22d. The lobe orientation of fingers 22a and 22b is said to be R (for right), while the lobe orientation of fingers 22c and 22d is said to be L (for left).

Suppose there are a number of N≥4 lobe fingers (N=4 in the case shown in FIG. 2). $N_R$ is the number of lobe fingers with lobe orientation R ($N_R<N$), i.e. fingers having the trailing edge lobe pointing in right direction when looking in downstream direction. $N_L$ is the number of lobe fingers with lobe orientation L ($N_L=N-N_R$), i.e. fingers having the trailing edge lobe pointing in left direction when looking in downstream direction.

Thus, there are two opposite types of directions or orientations (R and L). The case where the lobes of two neighboring fingers have the same trailing edge direction or orientation is referred to as a "grouped lobe arrangement" ( . . . LL . . . or . . . RR . . . ), while the cases where the lobes of two neighboring fingers have the opposite trailing edge direction or orientation is referred to as an "alternating lobe arrangement" ( . . . LR . . . or . . . RL . . . )

These grouped and alternating lobes arrangements, where neighboring lobes shall have the same resp. opposite direction are object of the present invention.

This includes that either all lobes have the same kind of orientation ($N_L=N$ or $N_R=N$) or that there is an arbitrary mix of them ($N_L+N_R=N$ with $N_L>0$ and $N_R>0$).

For a Lobe Lance with N≥4 Lobe Fingers 22 the Situation is as Follows:

With grouped lobe arrangement, the streamwise vortices generated by the lobe shape are in the same direction, which are observed to combine to bigger vortices, in case the shape of lobe and the distance between two lobe fingers is properly designed or adjusted.

With alternating lobe arrangement, the streamwise vortices at the trailing edge are in different directions; therefore they do not combine.

Thus, combined streamwise vortices make it possible to have large scale mixing in transverse direction, while the uncombined vortices in an alternating arrangement will only make small scale mixing.

Furthermore, in order to avoid the flow getting asymmetric, it is preferred to have $N_R \approx N_L$ (preferably $N_R=N_L$).

In general, the preferred combinations look like this:
1. RR . . . RRLL . . . LL,
2. LL . . . LLRR . . . RR,
3. RR . . . RRLL . . . LLRR( . . . RRLL . . . LL)
4. LL . . . LLRR . . . RR(LL . . . LLRR . . . RR)
5. RRLL . . . LLRR( . . . RRLL)
6. LLRR . . . RRLL( . . . RRLL)

with $N/2=N_R=N_L$ for N being an even number, or with $N/2=N_R+0.5=N_L-0.5$ or $N/2=N_R-0.5=N_L+0.5$ for N being an odd number.

As illustrations for the above described arrangements for N=8 the following arrangements might be used:
1. RRRRLLLL
2. LLLLRRRR
3. RRLLRRLL
4. LLRRLLRR
5. RRLLLLRR
6. LLRRRRLL Less preferable, particularly in burners with sidewalls, are arrangements with all lobes of the same type or arrangements which are completely asymmetric:
 RR . . . RR, (All of the same type)
 LL . . . LL, (All of the same type)
 RLRRLLLRL (example for an asymmetric case)

Figure 3:
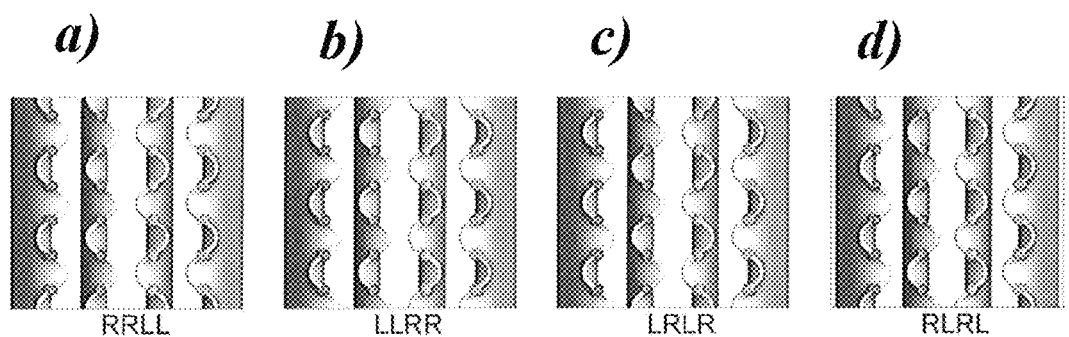
FIG. 3 shows in a view against hot gas flow direction four different possibilities of the lobe orientation of a lobe lance according to FIG. 2.

For the Special Case of a Lobe Lance with N=4 Lobe Fingers 22 the Situation is as Follows:

For the N=4 case the preferred variants of lobe orientation are:
 RRLL (see FIG. 2 and FIG. 3(a)),
 LLRR (see FIG. 3(b))

These variants ensure that vortices combine to large structures, and symmetry of the flow is given. Given this, the RRLL variant currently is preferred for the implementation in a gas turbine.

A limited but nevertheless useful combination of the vortices is given for the following versions, while flow symmetry is still kept valid. Such combinations are:
 RLLR,
 LRRL.

Less preferable are variants where three lobe fingers (or four fingers) of the same type are side by side, with one (or no) alternating lobe finger:
 RRRL, RLLL,
 LLLR, LRRR,
 RRRR, LLLL.

These variants introduce asymmetry into the flow and are therefore less preferable.

The following give the mixing zone without vortex combination:
 RLRL (see FIG. 3(d)),
 LRLR (see FIG. 3(c)).

Even less preferable are variants wherein only one out of the two middle lobe fingers is different to the other three fingers, since no symmetry is given and vortices cannot combine properly for half of the flow:
 RRLR,
 RLRR,
 LLRL,
 LRLL.

When the lobe fingers 22a-d are arranged between side walls, there are two types of side finger orientations, using the first row of lobe trailing edge facing the left and right side wall as an example:
 (left wall) R . . . L (right wall)
 (left wall) L . . . R (right wall)

For an even number of injector nozzles per lobe finger in terms of the mixing performance the first version R . . . L is preferred.

Preferably, two or more of the lobe fingers are arranged such that their trailing edges are closer together than their leading edges (e.g. in FIG. 2). Preferably, two or more lobe fingers with the same orientation (LL, RR) are arranged such that their trailing edges are closer together than their leading edges. Each lobe finger has a chord stretching from its leading edge to its trailing edge. This chord would normally be substantially parallel to the hot gas flow, and would normally bisect a cross-section of the lobe finger. The lobe lance could have all the lobe fingers in this configuration, particularly when four lobe fingers are provided. When the trailing edges are closer together than the leading edges, the vortices are already moving towards one another at the lobe finger trailing edge, meaning that it is easier for the vortices to combine.

The example shown in FIG. 2 is in a secondary combustor in a sequential combustion turbine. In some cases, such as single combustor turbines, this invention could be incorporated in a first stage combustor. In cases where three or more combustors are provided, the invention could be incorporated in the third or later stage.

LIST OF REFERENCE NUMERALS 10 gas turbine (GT, e.g. GT26)
11 rotor
12 casing
13 air inlet
14 compressor
15 combustor (annular, e.g. EV)
16 high pressure (HT) turbine
17 combustor (annular, e.g. secondary, e.g. SEV)
18 low pressure (LP) turbine
19 exhaust gas outlet
20 machine axis
21 lobe lance
22 finger
22a-d finger
23 leading edge
24 trailing edge
25 upper plate
26 lower plate
27 nozzle
28 lobe
29 liquid fuel supply
30 air plenum
31 gas plenum
32 direction (of hot gas flow)

The invention claimed is:

1. A lobe lance for a gas turbine combustor, comprising:
a plurality of N lobe fingers wherein N≥4, each of said lobe fingers is configured as a streamlined body which has a streamlined cross-sectional profile, said streamlined body has two surfaces parallel to a direction of hot gas flow, said surfaces being joined at respective upstream sides by a leading edge and being joined at respective downstream sides forming a trailing edge, each lobe finger including a plurality of nozzles for injecting a gaseous and/or liquid fuel mixed with air distributed along said trailing edge, and lobes running between said nozzles provided at said trailing edge for impacting the mixing quality and reducing pressure loss in said combustor, wherein the lobes of each lobe finger has one of two opposite orientations (R, L) with respect to the direction of hot gas flow, and the lobes of all lobe fingers follow a predetermined pattern of orientation across the lobe fingers, and at least two pairs of adjacent lobe fingers of the plurality of lobe fingers has the same lobe orientation resulting in a grouped lobe arrangement ( . . . LL . . . and . . . RR . . . ) such that at least two vortices generated downstream of said lobe fingers combine, wherein each lobe finger of the plurality of lobe fingers having a lobe orientation (R) has trailing edge lobes with an apex pointing in a right direction when looking downstream and each lobe finger of the plurality of lobe fingers with a lobe orientation (L) has trailing edge lobes with an apex pointing in a left direction when looking downstream,
wherein N=NR+NL with NR being a number of lobe fingers of the plurality of lobe fingers having a first lobe orientation (R), and NL being the number of lobe fingers of the plurality of lobe fingers having a second lobe orientation (L) opposite to said first lobe orientation, and
wherein NR and NL are both at least 2.

2. The lobe lance as claimed in claim 1, wherein $N_R$ and $N_L$ are within 1.

3. The lobe lance as claimed in claim 1, wherein said predetermined pattern of orientation is one of the following patterns:
RR . . . RRLL . . . LL,
LL . . . LLRR . . . RR,
RR . . . RRLL . . . LLRR
RR . . . RRLL . . . LLRR . . . RRLL . . . LL,
LL . . . LLRR . . . RR
LL . . . LLRR . . . RRLL . . . LLRR . . . RR,
RRLL . . . LLRR
RRLL . . . LLRR . . . RRLL,
LLRR . . . RRLL
LLRR . . . RRLL . . . RRLL,
with $N/2=N_R=N_L$ for N being an even number, or with $N/2=N_R+1=N_L-1$ or $N/2=N_R-1=N_L+1$ for N being an odd number.

4. The lobe lance as claimed in claim 3, wherein N=8, and that said predetermined pattern of orientation is one of the following patterns:
RRRRLLLL,
LLLLRRRR,
RRLLRRLL,
LLRRLLRR,
RRLLLLRR,
LLRRRRLL.

5. The lobe lance as claimed in claim 1, wherein N=4.

6. The lobe lance as claimed in claim 5, wherein said predetermined pattern of orientation is either RRLL or LLRR.

7. The lobe lance as claimed in claim 5, wherein said predetermined pattern of orientation is either RLLR or LRRL.

8. The lobe lance as claimed in claim 5, wherein said predetermined pattern of orientation is one of the following patterns:
RRRL, RLLL,
LLLR, LRRR,
RRRR, LLLL.

9. The lobe lance as claimed in claim 1, wherein said plurality of lobe fingers are arranged between left and right side walls, and lobe fingers adjacent to said side walls have a predetermined lobe orientation according to one of the following schemes:
(left wall) R . . . L (right wall),
(left wall) L . . . R (right wall).

10. The lobe lance as claimed in claim 1, wherein each of said plurality of lobe fingers has an even number of nozzles, and lobe fingers have a predetermined lobe orientation according to the scheme (left wall) R . . . L (right wall).

11. The lobe lance as claimed in claim 1, wherein each lobe finger of the plurality of lobe fingers has a lobe finger chord bisecting the lobe finger from the leading edge to the trailing edge and the lobe finger chords of two of said lobe fingers are closer to each other at the trailing edge than at the leading edge.

12. A gas turbine comprising:
the lobe lance of claim 1.

* * * * *